Feb. 24, 1942.   L. CERONI   2,273,936
OPAQUE AND SLIDE PROJECTION APPARATUS
Filed Jan. 23, 1939
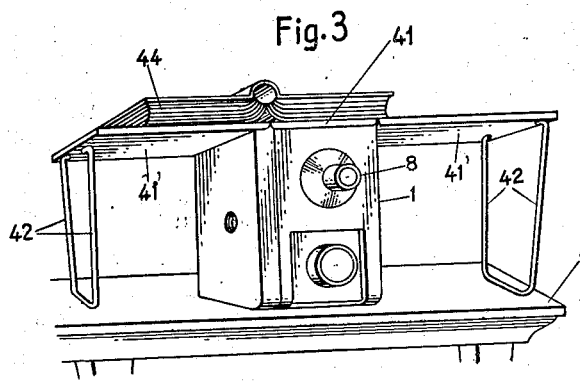
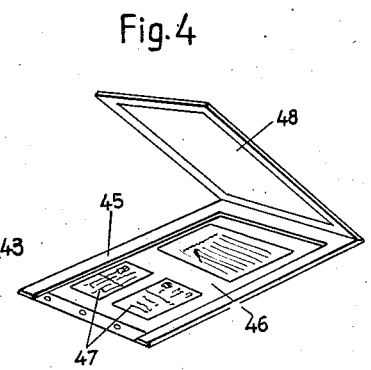
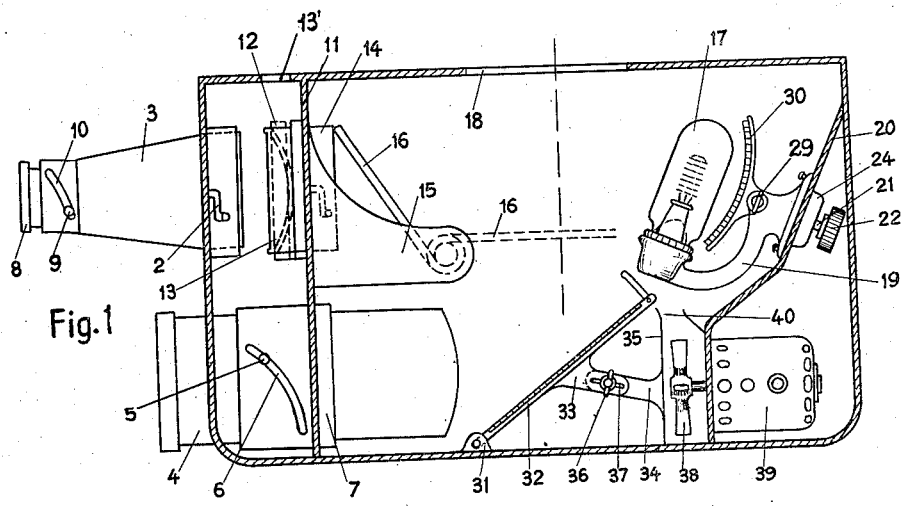
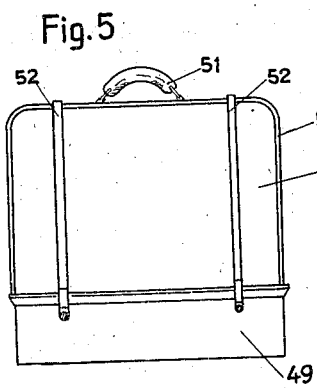
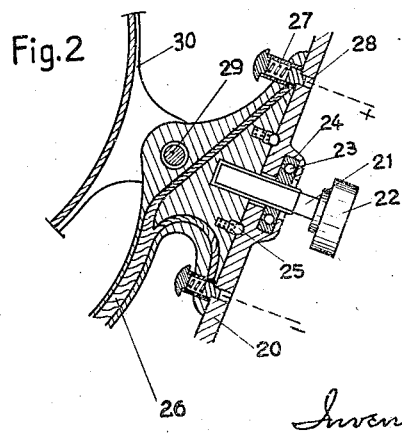
Inventor
Leonardo Ceroni
By Summers & Young
Attys Patented Feb. 24, 1942

2,273,936

UNITED STATES PATENT OFFICE 2,273,936

OPAQUE AND SLIDE PROJECTION APPARATUS

Leonardo Ceroni, Moncalieri, near Turin, Italy

Application January 23, 1939, Serial No. 252,495
In Italy February 2, 1938

6 Claims. (Cl. 88—26)

This invention refers to opaque and slide projection apparatus commonly used for class-work and entertainment purposes.

In the known apparatus of this type the aperture, against which the subject, the image of which is to be projected, is placed, is formed in the lower part of the projector box and the subject is placed into said aperture by means of a holder resiliently pressed thereon. It is obvious that this arrangement does not allow of a wide use of the apparatus as, owing to the limited space under the projector large sized subjects cannot be inserted; moreover it is necessary to provide a support for the apparatus in addition to the subject-holder.

One of the objects of this invention is to provide an apparatus, in which the aperture is formed in the upper projector housing face, so that a support for the projector and subject-holder may be dispensed with, the subject being held in the aperture by its own weight.

Another object of the invention is to provide a projection apparatus of the abovesaid type substantially in the form of a palallelepiped, the faces of which are substantially plane and are absolutely free of protrusions with the exception of the wall carrying the lenses, so that, when in use, the apparatus may be placed on any of its projection-free faces. The face carrying the lenses may also be used as a base for the apparatus, which is then placed on a table suitably perforated for the introduction of the objectives. It will thus be possible to direct the projection upon the side walls or ceiling or floor of the projection room by simply changing the apparatus base. Images of subjects having unchangeable positions, such as stationary subjects or subjects of varying depth, liquid containing vessels, test glasses, etc. may thus be projected. For instance artistic-demonstrative pictures of cupolas, ceilings, flying aeroplanes, heavenly bodies are projected on the ceiling of the room, or pictures of manoeuvring military forces are projected placing the side of the camera carrying the objectives on a table provided with apertures for accommodating the objectives, so that the projection of any geographical chart is obtained on the floor and pieces representing the manoeuvring troops moved thereon; physical instruments to be held in a vertical position, for instance densimeters may be projected, by placing the apparatus on one of its side faces.

Another object of the invention is to provide an apparatus in which the support of the source of light is adjustably mounted in the projector housing, so that the bulb of the source of light may be maintained in the most suitable position to prevent injury thereto whatever be the side on which the projector lies on the supporting plane.

Another object of the invention is to provide an apparatus of the above specified type having two tiltable boards hinged to the side edge of the face provided with the projection aperture and fitted with tiltable supports, thus forming, when in the raised position, a large supporting table and in the tilted position against the sides of the housing, a cover for the latter.

These and other objects of the invention will appear from the following specification and reference to the annexed drawing, in which:

Fig. 1 is a longitudinal section on a plane passing through the axis of the objectives;

Fig. 2 is a detailed view of the mechanism for rotating the lamp holder and concave mirror;

Fig. 3 is a perspective view of the projector housing in the more usual position for the opaque projection;

Fig. 4 is a perspective view of a carrier of simple form, and

Fig. 5 shows the projector in the closed position ready for transport.

Referring to the drawing, 1 denotes the projector casing, at one end wall of which is connected by means of a bayonet joint 2 an objective holder 3 for the slide projection. An objective 4 for opaque projection is mounted axially displaceably and capable of rotating on this same end wall. The objective 4 is for this purpose provided with a set screw 5 engaging a helical slot in the supporting sleeve 7 secured to the housing; the objective 4 may thus be fully retracted into the housing or it may be axially displaced for focussing the pictures on the projection screen and fixed in adjusted position by means of the screw 5.

The slide objective 8 may in a similar manner be focussed on the objective holder 3 by means of a screw 9 engaging a helical slot 10.

The sleeve 7 is carried by a partition 11 of the housing, which on the optical axis of the objective for slide projection carries on one side a holder 12 adapted to receive a frame 13 carrying the slides or testing glasses introduced through an opening 13' in the upper side, said glasses being viewed by transparency for the optical examination of liquids, semi-fluids and the like. The partition 11 carries on its other side an optical condenser 14 for concentrating the beam of light on the slide to be projected and a bracket 15 at the end of which is journaled a mirror 16 adapted to concentrate the light beam, emitted by the light source 17 on the aperture 18 in the upper face of the housing on which the subject or opaque body is accommodated for the opaque projection.

The mirror 16 serves for the opaque projection and is therefore placed in the position shown in full lines. Said mirror, when slide projection is desired, is tilted into the horizontal position shown in broken lines to leave free passage to the light beam along the optical axis of the slide objective 8.

The projection lamp 17 is mounted in a lampholder carried by an arm 19 rotatably mounted on an inclined partition 20 of the housing. The arm 19 (Fig. 2) is carried by a spindle 21 ending in an operating push button 22 and secured into the inner ring of a ball bearing 23 fitted into a casing 24 connected to the partition 20. Resilient stops 25 arranged in the spindle hub and adapted to engage in notches in the partition 20 hold the arm in the adjusted position.

The lamp leads 26 contact two carbon brushes 27 coacting with contact plates 28 mounted insulated from each other in the partition 20 and connected by means of terminals (not shown) with the main leads. The contact plates are located on the same diametral lines passing through the stop notches, so that in each working position of the arm the lamp feed circuit is automatically closed.

A concave mirror 30 situated behind the lamp is adjustably mounted on the arm 19 by means of a bolt and wing nut 29, in such manner as to direct the light beam towards the aperture 18.

A mirror 32 adapted to deflect the light rays issuing from the aperture 18 in a parallel direction to the optical axis of the objective 4 for the opaque projection is journaled to a bracket 31 secured to the lower side of the housing; this mirror is provided with an arm 33 secured to an arm 34 carried by a casing 35 by means of a clamp screw 36 engaging a slot 37. It is thus possible to adjust at will the inclination of the mirror 32.

A blade wheel 38 is arranged in the casing 35 and actuated by a motor 39 and is adapted to produce a stream of cooling air, which, issuing from the space 40, passes the lamp holder and expands into the housing cooling the parts located therein.

A slide-carrying table may be arranged at the upper part of the housing. The table is constituted by a central board 41 having an aperture registering with the aperture 18 and two side boards hinged to said central board (Fig. 3).

The side boards 41' may be tilted on the housing sides in the manner of a casing and may be extended in the same plane as the central part 41, as shown in Fig. 3; the boards may be held in said position by means of the legs 42 when the projector is laid on a plane surface, for instance on a table 43.

The legs 42 may be folded against the inner side of the boards, thus allowing the latter to be folded against the housing sides.

In the position shown in Fig. 3 the projector is ready for the more common use for opaque projection. As may be clearly seen in said figure, the space surrounding the aperture 18 is completely free in all directions in the supporting plane, so that the projections are easily and quickly produced whatever the size, weight and depth of the subjects, such as books, maps or sheets may be.

Fig. 3 shows a large book 44 simply laid on the table and held to the aperture by its own weight without the action of any pressing device.

According to the invention, large subject carriers may be provided, as shown in Fig. 4, for the projection of a plurality of designs or pictures at the same time or for projecting illustrations on sheets of large size. Said multiple object carrier comprises a frame 45 accommodating a glass plate 46, on which the illustrations, cards or the like 47 are placed and held in position by a velvet lined cover.

It will be seen that with the above described arrangement of the supporting plane it is possible to keep the room continually dark when the carriers are passed, as it may be advanced without interruption. An instantaneous lighting of the room is obtained by indirect light by simply lifting the object off the aperture 18 without any need of other switches and lamps. Finally the operator is not dazzled, which constituted an unavoidable inconvenience in the known apparatus provided with a subject carrying plate each time a subject to be projected is placed on the plate.

The aperture has moreover the advantage of quickly discharging outwardly the heat generated by the light source each time the opaque object is replaced.

When the apparatus is not in use, the boards 41 are folded over the sides of the projector housing 1, and the projector is then fitted in the manner of a cover on a case 49 adapted to contain the resistances for the various line voltages and the subject holder 3 for the slide projection; the objective for the opaque projection is retracted, a U-shaped casing 50 provided with a handle 51 is fitted on the parts not covered by the boards 41 and 41' and the whole is assembled by means of stirrups 52, the ends of which are secured by means of eyelets to the body of the case 49. The apparatus can thus be easily transported like an ordinary portemanteau.

What I claim is:

1. Projection apparatus comprising a housing of substantially parallelepiped form having flat outer surfaces free of protruding portions, so that any of said surfaces may be utilized as a supporting base for the apparatus, the surface which in normal use of the apparatus constitutes its upper surface being provided with an exposure opening, said upper surface serving as a support for a subject an image of which is desired to be projected, regardless of its shape, size and weight, projecting means in said housing mounted to maintain exactly their relative position regardless of what position the housing may be placed in, said means comprising an electric lamp which must be in a predetermined position for operation, a turnable arm in said housing for supporting said lamp and means for rotating said arm, thereby maintaining said lamp in its predetermined position on whatever surface the housing is supported during projection, and a brush device carried by said arm and said housing for automatically closing the feed circuit of said lamp in the various adjusted positions of said arm.

2. Projection apparatus comprising walls forming a housing of substantially parallelepiped form, the side and rear walls thereof having flat outer surfaces free of projections whereby in use any one of said projection-free wall surfaces may serve as the supporting surface, said housing having an exposure opening in one of said projection-free walls, an electric lamp, a lamp holder in said housing for holding said lamp in position to direct light upon a subject to be projected located at the exposure opening, a reflector opposite said lamp for reflecting light from said lamp onto said subject from the opposite angle from the direct light from said lamp, a rotatable support for said lamp holder, manually-operable means for rotating said lamp holder support so that the lamp may be oriented to its best position for operation regardless of the position of the housing in use, one wall of said housing having a projection opening, and an objective for projecting an image of the subject at the exposure opening through the projection opening.

3. Projection apparatus comprising walls forming a housing of substantially parallelepiped form, the side and rear walls thereof having flat outer surfaces free of projections whereby in use any one of said projection-free wall surfaces may serve as the supporting surface, said housing having an exposure opening in one of said projection-free walls, the front wall having an opening for episcopic projection and an opening for diascopic projection, an objective alined with each of said projection openings respectively, an electric lamp, a lamp holder for holding said lamp with its light source alined with the diascopic projection objective, a reflector pivotally mounted in said housing opposite said lamp in line with diascopic objective and the lamp to cut light off from the diascopic projector and reflect it on a subject at the exposure opening to be episcopically projected through the episcopic projection opening when said reflector is in one position of pivotal adjustment, and for cutting off light from the lamp from the episcopic projection opening and allowing it to pass to the diascopic projection opening when in another position of pivotal adjustment, the housing having an opening adjacent the diascopic projection objective for insertion of slides for diascopic projection.

4. Projection apparatus comprising walls forming a housing of substantially parallelepiped form, the side and rear walls thereof having flat outer surfaces free of projections whereby in use any one of said projection-free wall surfaces may serve as the supporting surface, said housing having an exposure opening in one of said projection-free walls, an electric lamp, a lamp holder in said housing for holding said lamp in position to direct light upon a subject to be projected located at the exposure opening, a reflector opposite said lamp for reflecting light from said lamp onto said subject from the opposite angle from the direct light from said lamp, a rotatable support for said lamp holder, manually-operable means for rotating said lamp holder support so that the lamp may be oriented to its best position for operation regardless of the position of the housing in use, one wall of said housing having a projection opening, an objective for projecting an image of the subject at the exposure opening through the projection opening, and a pair of boards hingedly secured to the housing along opposite edges of the wall having the exposure opening, said boards being foldable against the adjacent sides of the housing and swingable outwardly to form lateral extensions of the surface having the exposure opening for enlarging the subject supporting surface.

5. Projection apparatus comprising walls forming a housing of substantially parallelepiped form, the side and rear walls thereof having flat outer surfaces free of projections whereby in use any one of said projection-free wall surfaces may serve as the supporting surface, said housing having an exposure opening in one of said projection-free walls, an electric lamp, a lamp holder in said housing for holding said lamp in position to direct light upon a subject to be projected located at the exposure opening, a reflector opposite said lamp for reflecting light from said lamp onto said subject from the opposite angle from the direct light from said lamp, a rotatable support for said lamp holder, manually-operable means for rotating said lamp holder support so that the lamp may be oriented to its best position for operation regardless of the position of the housing in use, one wall of said housing having a projection opening, an objective for projecting an image of the subject at the exposure opening through the projection opening, a pair of boards hingedly secured to the housing along opposite edges of the wall having the exposure opening, said boards being foldable against the adjacent sides of the housing and swingable outwardly to form lateral extensions of the surface having the exposure opening for enlarging the subject supporting surface, and a leg hingedly connected to the outer edge of each of said boards so as to be swung inwardly against the under sides of said boards and downwardly when the boards are extended at right angles to said boards to serve as supports for said boards in operation.

6. Projection apparatus comprising walls forming a housing of substantially parallelepiped form, the side and rear walls thereof having flat outer surfaces free of projections whereby in use any one of said projection-free wall surfaces may serve as the supporting surface, said housing having an episcopic exposure opening in one of said projection-free walls, the front wall having an opening for episcopic projection and an opening for diascopic projection located above the episcopic projection opening, an objective alined with each of said projection openings respectively, an electric lamp, a lamp holder for holding said lamp with its light source alined with the diascopic projection objective, a reflector pivotally mounted in said housing opposite said lamp in line with the diascopic objective and the lamp to cut light off from the diascopic projector and reflect it on a subject at the exposure opening to be episcopically projected through the episcopic projection opening when said reflector is in one position of pivotal adjustment, and for cutting off light from the lamp from the episcopic projection opening and allowing it to pass to the diascopic projection opening when in another position of pivotal adjustment, the wall of the housing containing the episcopic exposure opening having an opening adjacent the diascopic projection objective for insertion of slides or the like for diascopic projection, whereby said opening adjacent the diascopic objective is on the top side so that open vessels for containing liquid can be inserted in said diascopic exposure opening vertically.

LEONARDO CERONI.